United States Patent Office 2,839,539
Patented June 17, 1958

2,839,539
FURAN INTERMEDIATES USEFUL TO MAKE PYRIDOXINE

Niels Elming and Jörgen Tormod Nielsen, Copenhagen, Denmark, and Niels Konrad Friedrich Wilhelm Clauson-Kaas, Haifa, Israel, assignors to A/S Sadolin & Holmblad, Copenhagen, Denmark No Drawing. Application November 15, 1955
Serial No. 547,016

Claims priority, application Great Britain
November 29, 1954

12 Claims. (Cl. 260—346.2)

This invention relates to the preparation of vitamin $B_6$ and new compounds which serve as intermediates in the production of vitamin $B_6$.

It is an object of this invention to provide a method for preparing vitamin $B_6$ (pyridoxine). Another object of this invention is the provision of novel intermediate compounds used in said preparation. Another object of this invention is to provide methods for preparing said novel intermediates.

The starting point for the synthesis of pyridoxine in accordance with the present method of this invention is a known furan having the general formula

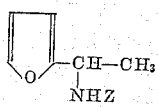

wherein Z is an acyl group. Any acyl derivative may be used, since the sole function thereof is to protect the amino grouping during the next steps of the process of this invention. Among the suitable acyl groups may be mentioned the lower alkanoyls (e. g. acetyl, propionyl and butyryl), aroyls (e. g. benzoyl, naphthoyl and substituted derivatives thereof), aralkanoyls (e. g. α-toluyl, β-phenylpropionyl and substituted derivatives thereof), and cycloalkanoyls; the preferred acyl group being that of a hydrocarbon carboxylic acid of less than ten carbon atoms.

In accordance with one feature of the process of this invention, the 2-(α-acylamidoethyl)-furan is converted to new compounds comprising amides of the general Formula I:

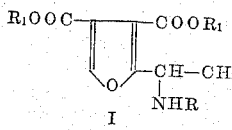

and acid-addition salts thereof, wherein R is hydrogen or Z, wherein Z is as hereinbefore defined, and $R_1$ is hydrogen or Y, wherein Y is alkyl (preferably lower alkyl such as methyl, ethyl, propyl and butyl) or cycloalkyl (preferably lower cycloalkyl such as cyclopentyl and cyclohexyl). This conversion can be effected by reacting the 2-(α-acylamidoethyl)-furan with an ethyne dicarboxylate, such as a di-alkyl (preferably lower alkyl) or dicycloaklyl ester, reducing the resulting new compound, which has the Formula II:

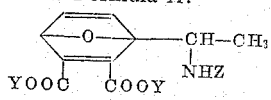

wherein Z and Y are as hereinbefore defined, to form a new compound of the Formula III:

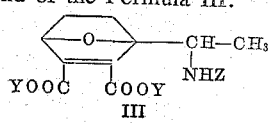

wherein Z and Y are as hereinbefore defined, and subjecting compound III to pyrolysis to split off ethylene, there thus being formed a compound of Formula I, wherein R is Z and $R_1$ is Y [compound I$a$].

Although this process can be conducted step-wise, with attendant isolation of each of the intermediates II and III, in order to substantially increase the yield of desired final product I$a$, the conversion of compound II to compound III and the pyrolysis of the latter is preferably effected in situ without isolation of the intermediates.

Compound I$a$ can then be converted to pyridoxine through the known intermediates, the 2-(α-acylamidoethyl)-3,4-bis(acyloxymethyl)furans [see U. S. application, Serial No. 547,888, filed November 10, 1955], by selective reduction of compound I$a$ directly or preferably by going through the following intermediate steps, whereby compounds of Formula I are prepared, wherein at least one of the radicals R and $R_1$ is hydrogen [compounds I$b$, I$c$ and I$d$]:

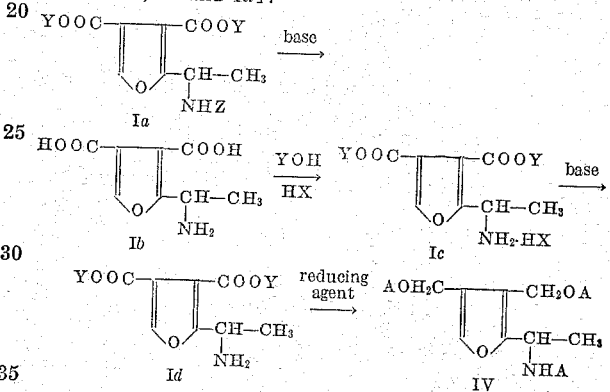

wherein HX is an acid, preferably a mineral acid such as hydrochloric acid, and $A_2O$ is an acid anhydride, preferably the acid anhydride of a low weight organic acid such as acetic anhydride.

PREPARATION OF COMPOUND I

The 2-(α-acylamidoethyl)-furans used as starting materials in the process of this invention can be produced according to the method described by Clauson-Kaas, Elming and Tyle in Acta Chem. Scand. 9, 1–8 (1955), for instance by acylating furan in the 2-position with acetic anhydride in the presence of boron trifluoride etherate, the keto group attached in the alpha-position in the substituent in the 2-position of the furan ring then being converted to a $CHNH_2$ group, for instance by conversion of the keto group to an oxime group by means of hydroxylamine, and subsequent reduction of the oxime group, whereupon the amino group can be protected by acylation. Suitable starting 2-(α-acylamidoethyl)-furans include, inter alia, 2-(α-alkanoylamidoethyl)-furans, preferably 2-(α-lower alkanoylamidoethyl)-furans such as 2-(α-acetamidoethyl)-furan and 2-(α-n-propionylamidoethyl)-furan; 2-(α-aroylamidoethyl)-furans, preferably those wherein the aroyl radical is that of a hydrocarbon carboxylic acid of less than ten carbon atoms as exemplified by 2-(α-benzamidoethyl)-furan and 2-(α-naphthoylamidoethyl)-furan; 2-(α-aralkanoylamidoethyl)-furans, preferably those wherein the aralkanoyl radical is that of a hydrocarbon carboxylic acid of less than ten carbon atoms [e. g. 2-(α-phenylacetamidoethyl)-furan and 2-(α-[β-phenylpropionyl]-amidoethyl)-furan]; and 2-(α-cycloalkanoylamidoethyl)-furans, preferably those wherein the cycloalkanoyl radical is that of a hydrocarbon carboxylic acid of less than ten carbon atoms.

The reaction of 2-(α-acylamidoethyl)-furan with ethyne dicarboxylate is carried out by heating in the presence or, preferably, in the absence of solvents. If the resulting 3,6-endoxo-3-(α-acylamidoethyl) - 3,6 - dihydrophthalic acid dialkyl (or dicycloalkyl) ester [compound II] is to be isolated, the reaction product is dissolved in a suitable solvent, for instance ether. On evaporation of a part of the solvent and storage at low temperature, compound II will be obtained in the form of beautiful crystals.

Compound II, either as formed in situ or after isolation, is then reduced with gaseous hydrogen in the presence of a catalyst, for instance a palladium catalyst (e. g. palladium on barium sulfate, palladium on calcium carbonate, or palladium on charcoal). This reaction is preferably conducted in an organic solvent by either directly dissolving the mixture resulting from the interaction of the 2-(α-acylamidoethyl)-furan with ethyne dicarboxylate or, after isolation of compound II, by dissolving compound II in an organic solvent, for instance ethyl acetate, acetone, or methylethyl ketone. When the theoretical amount of hydrogen has been taken up, i. e. the amount required for saturating one of the double bonds (1 mol per mol of starting material), the catalyst is filtered off and the solvent is evaporated, preferably in vacuo. The residue may then be recrystallized, e. g. from ether, to yield pure 3,6-endoxo-3-(α-acylamidoethyl)-3,4,5,6-tetrahydrophthalic acid dialkyl (or dicycloalkyl) ester [compound III] or the resulting impure residue may be used directly in the next step.

Compound III, either with or without purification, is pyrolysed by being heated for about one hour at an elevated temperature as a result of which ethylene is split off and the desired compound Ia is formed. This compound may be recrystallized from ether to form white crystals.

Compound II is preferably produced with a small excess, for instance 5%, of the ethyne dicarboxylate. The reaction may be performed at any temperature between about 50° C. and about 125° C. for one or more hours and preferably at about 90–100° C. for about three hours. The reaction may also be carried out in the presence of solvents such as for instance, benzene, ether or tetrahydrofuran.

The reduction of compound II is preferably effected under a gas pressure of the hydrogen of about one atmosphere, although higher or lower pressures may also be employed. The temperature is not critical but good results are obtained at ambient temperature. The reduction may also be carried out at an elevated temperature, for instance at the reflux temperature of the solvent.

The final pyrolysis may be carried out at ordinary pressure or in vacuo, for instance in a water-jet vacuum (10–30 mm. Hg), and at a temperature between about 150° C. and about 225° C., preferably at about 200° C., either in the absence or in the presence of a solvent. After the evaporation of the solvent (if used), the pyrolysis product can be recrystallized from ether or some other solvent.

The following examples illustrate this aspect of the process of this invention, the first example illustrating a modification of process whereby 2-(α-acetamidoethyl)-furan is converted to 2-(α-acetamidoethyl)-3,4-dicarbethoxyfuran, without isolation of the intermediate products, and the next four examples illustrating a modification whereby each of the intermediates, Compound II and Compound III, are isolated:

*Example 1*

PREPARATION OF 2-(α-ACETAMIDOETHYL)-3,4-DICARBETHOXYFURAN 17.2 g. (0.112 mole) of 2-(α-acetamidoethyl)-furan and 20.1 g. (0.118 mole) of diethyl acetylenedicarboxylate are mixed and heated to 100° C. for 3.5 hours. After cooling, the reaction mixture is dissolved in 120 ml. of acetone and then shaken with 10% palladium charcoal catalyst (0.42 g.+0.20 g.) at room temperature under one atmosphere of hydrogen until about 2,470 ml. of hydrogen (about 100%) has been taken up. After filtration, the solvent is evaporated in vacuo and the light-brown residue heated in an oil bath at 190–200° C. under 13 mm. pressure of mercury for one hour. The reaction mixture is crystallized from ether. The yield is about 19.4 g. of 2-(α-acetamidoethyl)-3,4-dicarbethoxyfuran in the form of white crystals, M. P. about 51–53° C. (Hershberg apparatus, corrected).

*Analysis.*—Calculated for $C_8H_6O_3N(OC_2H_5)_2(COCH_3)$ (297.3): C, 56.6; H, 6.4; N, 4.7; $OC_2H_5$, 30.3; $COCH_3$, 14.5. Found: C, 56.9; H, 6.4; N, 4.7; $OC_2H_5$, 30.5; $COCH_3$, 14.8.

The mother liquor from the 19.4 g. of 2-(α-acetamidoethyl)-3,4-dicarbethoxyfuran is distilled from an oil bath. The main fraction (about 6.0 g., B. P. 0.1, 178–186° C.) is crystallized from ether. The additional yield is about 2.59 g. of 2-(α-acetamidoethyl)-3,4-dicarbethoxyfuran (white crystals, M. P. about 49–51° C.).

Found: C, 56.3; H, 6.2; N, 4.6; $OC_2H_5$, 30.3; $COCH_3$, 14.6.

The total yield of 2-(α-acetamidoethyl)-3,4-dicarbethoxyfuran is thus about 22.0 g. (approximately 66%).

*Example 2*

PREPARATION OF 3,6-ENDOXO-3-(α-ACETAMIDOETHYL)-3,6-DIHYDROPHTHALIC ACID DIETHYL ESTER [COMPOUND II, Y=$C_2H_5$; Z=$CH_3CO$]

4.60 g. (0.030 mol) of 2-(α-acetamidoethyl)-furan and 5.35 g. (0.0315 mol) of diethyl ethyne dicarboxylate are mixed and then heated for 3.5 hours at 100° C. After cooling, the reaction mixture is recrystallized from ether. The yield is about 4.33 g. (approximately 45%) of compound II [Y=$C_2H_5$; Z=$CH_3CO$] in the form of white crystals melting at about 127–129° C. (Hershberg apparatus, corrected). After another recrystallization from ether, the melting point of the compound II is about 129–130° C.

$C_{10}H_8O_3N(OC_2H_5)_2(COCH_3)$ calculated: C, 59.4; H, 6.6; N, 4.3; $OC_2H_5$, 27.9; $COCH_3$, 13.3. Found: C, 59.5; H, 6.3; N, 4.7; $OC_2H_5$, 27.8; $COCH_3$, 13.3.

*Example 3*

PREPARATION OF COMPOUND II [Y=$C_2H_5$; Z=$CH_3CO$]

4.60 g. (0.030 mol) of 2-(α-acetamidoethyl)-furan and 5.35 g. (0.0315 mols) of diethyl ethyne dicarboxylate are poured into a round-bottomed flask and heated on a water bath. During this heating, the reaction mixture acquires a brown color. After cooling, 200 mls. ether are added, and the mixture is heated to boiling. The mixture is then filtered and evaporated to a volume of 100 mls. After storage at room temperature and subsequent cooling to 0–10° C., beautiful crystals of compound II [Y=$C_2H_5$; Z=$CH_3CO$] separate. The crystals are washed with cooled ether. The product on drying for one hour at 50° C. and 0.1 mm. Hg is then found to melt at about 127–129° C.

*Example 4*

PREPARATION OF 3,6-ENDOXO-3-(α-ACETAMIDOETHYL)-3,4,5,6-TETRAHYDROPHTHALIC ACID DIETHYL ESTER [COMPOUND III, Y=$C_2H_5$; Z=$CH_3CO$]

A mixture of 3.71 g. of 3,6-endoxo-3-(α-acetamidoethyl)-3,6-dihydrophthalic acid diethyl ester, prepared by the procedure of Example 2 or 3, 50 ml. of ethyl acetate and 0.50 g. of a palladium/barium sulphate catalyst are shaken at room temperature under a hydrogen pressure of one atmosphere until about 285 mls. hydrogen (about 100%) have been taken up. After filtration, the solvent is evaporated in vacuo and the residue is recrystallized from ether to give about 3.02 gms. of compound III [Y=$C_2H_5$; Z=$CH_3CO$] as white crystals melting at about 107–109° C. On repeated recrystallization, the melting point rises to about 109–110° C. Another 0.30 g. of compound III [Y=$C_2H_5$; Z=$CH_3CO$] (melting point about 107–109° C.) is recovered from the mother liquid of the first ether crystallization, the total yield of this compound thus amounting to about 3.32 g. (approximately 89%).

$C_{10}H_{10}O_3N(OC_2H_5)_2(COCH_3)$ calculated: C, 59.1; H, 7.1; N, 4.3; $OC_2H_5$, 27.7; $COCH_3$, 13.2. Found: C, 58.9; H, 7.1; N, 4.7; $OC_2H_5$, 27.6; $COCH_3$, 13.2.

*Example 5*

PREPARATION OF 2-(α-ACETAMIDOETHYL)-3,4-DICARBETHOXYFURAN [COMPOUND Ia, Z=$CH_3CO$; Y=$C_2H_5$]

1.90 g. of 3,6-endoxo-3-(α-acetamidoethyl)-3,4,5,6-tetrahydrophthalic acid diethyl ester, prepared by the procedure of Example 4, is heated for one hour in an open flask in an oil bath having a temperature of 190–200° C. The reaction mixture is recrystallized from ether. About 1.34 g. (approximately 77%) of 2-(α-acetamidoethyl-3,4-dicarbethoxyfuran is obtained in the form of white crystals melting at about 50–52° C.

$C_9H_6O_3N(OC_2H_3)_2(COCH_3)$ calculated: C, 56.6; H, 6.4; N, 4.7; $OC_2H_5$, 30.3; $COCH_3$, 14.5. Found: C, 56.7; H, 6.5; N, 4.9; $OC_2H_5$, 30.4; $COCH_3$, 14.8.

In a similar manner, by substituting other 2-(α-acylamidoethyl)-furans for the 2-(α-acetamidoethyl)-furan of Examples 1, 2, or 3, the corresponding 2-(α-acylamidoethyl)-3,4-dicarbethoxy-furan derivatives are produced. Thus, 2-(α-propionylamidoethyl)-furan yields 2-(α-propionylamidoethyl)-3,4-dicarbethoxyfuran and 2-(α-benzamidoethyl)-furan yields 2-(α-benzamidoethyl)-3,4-dicarbethoxyfuran. Furthermore, if another ester of acetylene dicarboxylic acid is substituted for the diethyl ester in the procedures of Examples 1, 2 or 3, the corresponding diester derivatives of 2-(α-acetamidoethyl)-3,4-dicarboxyfuran are formed. Thus, dimethyl acetylenedicarboxylate yields 2-(α-acetamidoethyl)-3,4-dicarbomethoxyfuran and dicyclohexyl acetylenedicarboxylate yields 2-(α-acetamidoethyl)-3,4-dicarbocyclohexyloxy-furan.

PREPARATION OF COMPOUND IV

To produce pyridoxine from the diester of 2-(α-acylamidoethyl)-3,4-dicarboxyfuran [compound Ia], it is necessary to first reduce this compound, preferably with lithium aluminum hydride, to thus form the corresponding 2-(α-acylamidoethyl)-3,4-bis(hydroxymethyl)-furan. This latter product is preferably acylated and then isolated in the form of the resultant 2-(α-acylamidoethyl)-3,4-bis(acyloxymethyl)-furan [compound IV]. As stated in application Serial No. 547,888, this latter compound may be oxidized in alcoholic solution to yield the corresponding 2,5-dihydro-2,5-dialkoxyfuran which may be converted to pyridoxine by being hydrolyzed in a neutral or acid medium, if desired, after having been saponified in an alkaline medium.

In this pyridoxine synthesis, the reduction of the diester of 2-(α-acylamidoethyl)-3,4-dicarboxyfuran has turned out to be the most critical reaction step, so that it is necessary to use selective reducing agents for said reduction of the diester of 2-(α-acylamidoethyl)-3,4-dicarboxyfuran. The term "selective reducing agents" comprises any agent that will reduce the ester groups more rapidly than the acylamido group, and of course, the best selective reducing agent would be one which under the conditions of the reaction reduces only the ester groups and not the acylamido group. As selective reducing agents may be mentioned alkali metal and alkaline earth metal aluminum hydrides or alkali metal and alkaline earth metal boron hydrides, for instance sodium aluminum hydride, lithium aluminum hydride, lithium boron hydride and calcium boron hydride. Catalytic hydrogenation on the other hand will give a less pronounced selective reduction, although it is possible to achieve a selective reduction, especially of the carbalkoxy groups, even in this case by the choice of suitable catalysts, for example, catalysts of the vertical group VIII of the periodic system which have been partially poisoned, for instance with lead or bismuth compounds, or certain intermetallic compounds such as copper chromite.

In the preparation of compound I, as hereinbefore detailed, it is necessary to employ as the 2-(α-aminoethyl)-furan reactant, a compound the amino group of which is protected by an acyl radical, and as the acetylene dicarboxylic acid reactant, a diester of acetylene dicarboxylic acid, in order to avoid undesired secondary reactions. Thus, the product primarily formed is always a diester of 2-(α-acylamidoethyl)-3,4-dicarboxy-furan. This compound [compound Ia] can be employed, as formed, in a direct conversion to the 2-(α-acylamidoethyl)-3,4-bis(acyloxymethyl)furan [compound IV] intermediate in the synthesis of pyridoxine as illustrated by the procedure of Example 6.

We have found, however, that the yield of compound IV can be substantially increased by selective hydrolysis of compound Ia to yield the correspondig diester of 2-(α-aminoethyl)-3,4-dicarboxyfuran [compound Id]. By "selective hydrolysis" is meant a hydrolyzing reaction by which the acylamido group is hydrolyzed much more rapidly and completely than the ester groups, and the best hydrolyzing agent would be one that hydrolyzes only the acylamido group and not the ester groups. Alkaline hydrolyzing agents do not exert such a selective hydrolyzing effect, while acid hydrolyzing agents to a greater or less extent do hydrolyze the acylamido groups more rapidly and more completely than the ester groups. Particularly good results are obtained when the hydrolysis is carried out in an alcoholic medium containing water only in an amount just sufficient for the hydrolyzing process. Under these conditions, the hydrolysis of the ester groups will be a reversible reaction so that the ester groups are split only to a slight extent, especially if comparatively large amounts of alcohol are employed. The hydrolysis of the acylamido group, on the other hand, is an irreversible reaction even under such conditions, and therefore, if the reaction is carried out for a sufficient time, the hydrolysis of this group will be practically complete. Suitable acid hydrolyzing agents are, for instance, the strong inorganic acids such as hydrochloric acid, sulfuric acid and nitric acid, and as usual in hydrolysis reactions, the acid may be employed in only catalytic amounts. Other suitable acid hydrolyzing agents include strong organic acids, principally benzene sulfonic acid, naphthalene sulfonic acid and methane sulfonic acid, and Lewis acids, for instance, boron fluoride etherate in alcoholic solution.

In an alternative and particularly preferred modification of this process for producing compound IV from compound Ia, the ester groups as well as the acylamido group are at first saponified, preferably in an alkaline medium to yield 2-(α-aminoethyl)-3,4-dicarboxyfuran [compound Ib]. This saponification process gives nearly quantitative yields of compound Ib, which may be converted to the corresponding ester [compound Ic, wherein the alcohol moiety is the same or different from the starting compound Ia] with the aid of an acid (HX) solution (e. g. hydrochloric acid solution) in anhydrous alcohol, YOH (e. g. anhydrous methanol). By using such an acid solution in anhydrous alcohol, a nearly quantitative yield of the diester of 2-(α-aminoethyl)-3,4-dicarboxyfuran in the form of acid (e. g. hydrochloride) salt [compound Ic] is prepared, which may be converted to the free base [compound Id] with the aid of an anhydrous alcohol solution of an alkali metal alcoholate (e. g. sodium methoxide or sodium ethoxide).

For the reduction, i. e. the conversion of the ester groups to hydroxymethyl groups, it is best to use the free base, for instance compound Id, although it is possible also to use the acid addition salt (e. g. hydrochloride) for instance compound Ic, as the starting material in which case the product is reacted with an alkali metal alcoholate in an anhydrous alcohol solution (e. g. sodium methoxide in anhydrous methanol), the solution evaporated, the residue extracted with anhydrous ether, and the resulting ether solution of the free base is used for the subsequent reduction which is carried out with, for instance, lithium aluminum hydride. The reduction product is most conveniently isolated after acylation, for instance acetylation, by means of an acid anhydride $A_2O$, to thus form compound IV, 2-($\alpha$-acylamidoethyl-3,4-bis (acyloxymethyl)-furan.

The following example illustrate methods for the conversion of the diester of 2-($\alpha$-acylamidoethyl)-3,4-dicarboxyfuran [compound Ia] to 2-($\alpha$-acylamidoethyl)-3,4-bis(acyloxymethyl)furan [compound IV]; Example 6 illustrating a direct conversion; and Examples 7, 8, 9, 10 and 11 illustrating the preferred method by means of the intermediates, compounds Ib, Ic and Id:

Example 6

PREPARATION OF 2-($\alpha$-ACETAMIDOETHYL)-3,4-BIS(ACETOXYMETHYL)-FURAN [COMPOUND IV, A=$CH_3CO$]

2.97 g. of 2-($\alpha$-acetamidoethyl)-3,4-dicarbethoxy-furan is dissolved in 20 ml. of dimethyl Cellosolve, and a mixture of 0.40 g. of lithium aluminum hydride and 20 mls. of ether is added, with stirring. The reaction mixture is evaporated to dryness and then refluxed for half an hour with 25 mls. of acetic anhydride. After cooling to room temperature, 100 mls. of ether is added, whereupon the mixture is filtered. The filtrate is evaporated and distilled in vacuo to yield about 1.94 g. of a pale yellow oil (boiling point about 183–189° C. at 0.1 mm. Hg) containing 2-($\alpha$-acetamidoethyl)-3,4-bis(acetoxymethyl)-furan, which may then be converted to pyridoxine (vitamin $B_6$) according to application Serial No. 471,896.

Example 7

PREPARATION OF 2-($\alpha$-AMINOETHYL)-3,4-DICARBOXYFURAN [COMPOUND Ib]

10.0 g. of 2-($\alpha$-acetamidoethyl)-3,4-dicarboxyfuran (0.034 mole) and 115 ml. of 3 N sodium hydroxide (0.34 mole) are heated under reflux for 24 hours. After cooling the mixture is brought to pH 8.7 by addition of concentrated hydrochloric acid. A small amount of a voluminous white precipitate is removed by filtration and discarded. The filtrate is then brought to pH 5.0 by further addition of concentrated hydrochloric acid. The white precipitate formed is removed by filtration and dried. The yield is about 5.42 g. of 2-($\alpha$-aminoethyl)-3,4-dicarboxyfuran in the form of white crystals, M. P. about 292–296° C. (decomposition) after darkening at about 280° (Kofler stage, corrected).

$C_8H_9O_5N$ (199.2) calculated: C, 48.2; H, 4.6; N, 7.0. Found: C, 48.3; H, 4.6; N, 7.0.

The mother liquor from the above 5.42 g. of compound Ib is evaporated to about 60 ml. whereby a further 0.56 g. of compound Ib is obtained as white crystals, M. P. about 291–294° C. (decomposition) after darkening at about 280° C.

Found: C, 48.4; H, 4.8; N, 7.1.

The total yield of compound Ib is thus about 5.98 g. (approximatley 90%).

Example 8

PREPARATION OF 2-($\alpha$-AMINOETHYL)-3,4-DICARBOXYFURAN HYDROCHLORIDE 199 mg. of 2-($\alpha$-aminoethyl)-3,4-dicarboxyfuran (0.0010 mole) and 7.5 ml. of 0.2 N hydrochloric acid (0.0015 mole) are mixed and heated. The solution is evaporated in vacuo, the residue dissolved in anhydrous methanol and the solution filtered. Precipitation with anhydrous ether gives about 210 mg. (approximately 89%) of 2-($\alpha$-aminoethyl)-3,4-dicarboxyfuran hydrochloride as white crystals, M. P. about 195–200° C. (decomposition) Hershberg apparatus, corrected).

$C_8H_{10}O_5NCl$ (235.6) calculated: C, 40.8; H, 4.3; N, 5.9; Cl, 15.0. Found: C, 40.7; H, 4.4; N, 6.2; Cl, 14.5.

Example 9

PREPARATION OF 2-($\alpha$-AMINOETHYL)-3,4-DICARBOMETHOXYFURAN HYDROCHLORIDE [COMPOUND Ic, Y=$CH_3$; X=Cl]

5.93 g. of 2-($\alpha$-aminoethyl)-3,4-dicarboxyfuran and 95 ml. of anhydrous methanol are mixed and treated with hydrogen chloride until 4.5 g. have been absorbed. The pale yellow solution is refluxed for 10 hours. After cooling, anhydrous calcium sulfate is added, the mixture shaken (2 hours) and the calcium sulfate then removed by filtration. The methanol and excess hydrogen chloride are removed under vacuum and the residue then placed in a vacuum desiccator over potassium hydroxide until completely dry. Dissolution in anhydrous methanol (15 ml.) and precipitation with anhydrous ether gives about 7.10 g. (approximately 90%) of 2-($\alpha$-aminoethyl)-3,4-dicarbomethoxyfuran hydrochloride as white crystals, M. P. about 167–169° C. (decomposition).

$C_8H_8O_3NCl(OCH_3)_2$ (263.7) calculated: C, 45.5; H, 5.4; N, 5.3; $OCH_3$, 23.5. Found: C, 45.8; H, 5.7; N, 5.5; $OCH_3$ 23.5; Cl, 13.6.

Example 10

PREPARATION OF 2-($\alpha$-AMINOETHYL)-3,4-DICARBOMETHOXYFURAN [COMPOUND Id, Y=$CH_3$]

To 264 mg. of 2-($\alpha$-aminoethyl)-3,4-dicarbomethoxyfuran hydrochloride (0.0010 mole) dissolved in 1 ml. of anhydrous methanol is added dropwise a solution of sodium methoxide in methanol [from sodium (28 mg., 0.0012 mole) and methanol (4 ml.)] at 0° C. The mixture is evaporated in vacuo from a water-bath at 20° C. and the residue then treated with anhydrous ether. The mixture is filtered and the filtrate evaporated in a vacuum (at least under 0.1 mm. of Hg) from a water-bath at 20° C. The yield is about 210 mg. (approximately 93%) of 2-($\alpha$-aminoethyl)-3,4-dicarbomethoxyfuran (colorless oil, $n_D^{25}$ 1.4952).

$C_8H_7O_3N(OCH_3)_2$ (277.2) calculated: C, 52.9; H, 5.8; N, 6.2; $OCH_3$, 27.3. Found: C, 52.9; H, 5.7; N, 6.5; $OCH_3$, 27.1.

Example 11

PREPARATION OF 2-($\alpha$-ACETAMIDOETHYL)-3,4-BIS(ACETOXYMETHYL)-FURAN [COMPOUND IV, A=$CH_3CO$]

3.27 g. of 2-($\alpha$-aminoethyl)-3,4-dicarbomethoxyfuran (0.0124 mole) dissolved in 12 ml. of anhydrous methanol is treated with sodium methoxide [from sodium (0.35 g., 0.0152 mole) and methanol (6 ml.)] and the reaction mixture worked up as described in Example 10. The residue is dissolved in 25 ml. of anhydrous ether and the solution added during 15 minutes with stirring to a mixture of 0.94 g. of lithium aluminum hydride (0.025 mole) in 40 ml. of anhydrous ether. Stirring is continued for 1 hour and the mixture then heated for 1 hour under reflux. After cooling, 40 ml. of acetic anhydride is added dropwise with stirring at 20° C. The ether is evaporated and the residue then heated 30 minutes under reflux. After cooling, 150 ml. of ether is added and the mixture is filtered and distilled from an oil-bath. The yield is about 2.21 g. (approximately 60%) of 2-($\alpha$-acetamidoethyl)-3,4-bis(acetoxymethyl)-furan (pale yellow liquid, B. P. about 0.1, 180–190° C., $n_D^{25}$ 1.4914).

$C_8H_{10}O_3N(COCH_3)_3$ (297.3) calculated: C, 56.6; H, 6.4; N, 4.7; $COCH_3$, 43.4. Found: C, 56.6; H, 6.7; N, 4.9; $COCH_3$, 42.7.

Crystallization from ether gives white crystals, M. P. about 88–91° C. The mixed M. P. with an authentic specimen is about 88–91° C.

Found: C, 56.6; H, 6.4; N, 4.8; $COCH_3$, 43.6.

Similarly, by substituting diesters of other 2-($\alpha$-acylamidoethyl)-3,4-dicarboxyfurans for the 2-($\alpha$-acetamidoethyl)-3,4-dicarbethoxy-furan in the procedure of Example 7, the same product as that prepared in the example is formed. Furthermore, if another acid anhydride (e. g. propionic acid anhydride) is substituted for the acetic anhydride in the procedure of Example 6 or 11, the corresponding 2-(α-acylamidoethyl)-3,4-bis(acyloxymethyl)-furan is formed (e. g. 2-(α-propionylamidoethyl)-3,4-bis(propionyloxymethyl)-furan).

PREPARATION OF PYRIDOXINE

Although pyridoxine can be prepared from the 2-(α-acylamidoethyl) - 3,4 - bis(acyloxymethyl)-furan by any of the methods disclosed in said application, Serial No. 547,888, for the sake of completeness the following example is included, illustrating a particularly preferred method for the conversion of 2-(α-acetamidoethyl)-3,4-bis(acetoxymethyl)-furan to pyridoxine:

*Example 12*

5.95 g. of 2 - (α - acetamidoethyl) - 3,4 - bis(acetoxymethyl)furan (0.020 mole) and 67 ml. of 3N sodium hydroxide (0.020 mole) are mixed and heated under reflux for 24 hours. After cooling the light-brown mixture is continuously extracted with ether (3 days). The ether extract is distilled from an oil-bath. The yield is about 3.02 g. (88% approximately) of 2 - (α - aminoethyl)-3,4-bis(hydroxymethyl)-furan (pale yellow liquid, B. P. 0.05, 165–171° C., $n_D^{25}$ 1.5304).

$C_8H_{13}O_3N$ (171.2) calculated: C, 56.1; H, 7.7; N, 8.2. Found: C, 56.3; H, 7.9; N, 8.5.

For the subsequent oxidation it is dispensable to distil the 2-(α-aminoethyl) - 3,4 - bis(hydroxymethyl) - furan, since it is possible to use the residue obtained after evaporation of the ether. The said residue is dissolved in a mixture of 5 ml. of methanol and 15 ml. of water. The mixture is cooled in a cooling-bath of 20° C. and 0.85 ml. of chlorine (measured at 80° C., 0.020 mole) is added during 10 minutes. 10 ml. of water is added and the mixture boiled in an open vessel for 20 minutes and then evaporated to dryness in vacuo. Crystallization from 99% ethanol gives about 2.49 g. of pyridoxine hydrochloride in the form of white crystals, M. P. about 207–209° C. (decomposition).

$C_8H_{12}O_3NCl$ (205.6) calculated: C, 46.7; H, 5.9; N, 6.8; Cl, 17.2. Found: C, 46.8; H, 5.9; N, 6.9; Cl, 17.3.

From the mother liquor a further 0.40 g. of pyridoxine hydrochloride is obtained in the form of white crystals, M. P. about 206–208° C. (decomposition).

Found: C, 46.7; H, 6.0; N, 6.8; Cl, 17.2.

The total yield of pyridoxine hydrochloride is thus about 2.89 g. [approximately 70% based upon 2-(α-acetamidoethyl)-3,4-bis(acetoxymethyl)-furan].

The overall yield of pyridoxine hydrochloride based upon 2-(α-acetamidoethyl)-3,4-dicarbethoxyfuran is thus approximately 34%.

The invention may be otherwise variously embodied within the scope of the appended claims.

We claim:

1. 2 - [α - (lower alkanoyl)amidoethyl] - 3,4 - dicarbo(lower alkoxy)furan.
2. 2-(α-acetamidoethyl)-3,4-dicarbethoxyfuran.
3. 2-(α-aminoethyl)-3,4-dicarboxyfuran.
4. 2-(α-aminoethyl)-3,4-dicarbo(lower alkoxy)furan.
5. A compound of the general formula

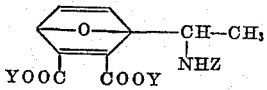

wherein Y is lower alkyl and Z is lower alkanoyl.

6. 3,6-endoxo - 3 - (α - acetamidoethyl) - 3,6 - dihydrophthalic acid diethyl ester.
7. A compound of the general formula

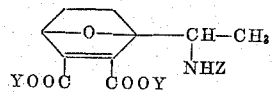

wherein Y is lower alkyl and Z is lower alkanoyl.

8. 3,6-endoxo - 3 - (α - acetamidoethyl) - 3,4,5,6 - tetrahydrophthalic acid diethyl ester.
9. A compound having the general formula

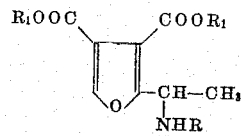

wherein R is selected from the group consisting of hydrogen, lower alkanoyl, benzoyl, naphthoyl, α-toluyl, β-phenylpropionyl and cyclohexanoyl, and wherein $R_1$ is selected from the group consisting of hydrogen, lower alkyl groups and the cyclohexyl group.

10. Mineral acid addition salts of a compound having the general formula

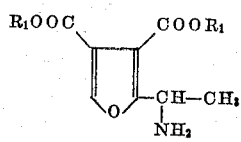

wherein $R_1$ is selected from the group consisting of hydrogen, lower alkyl groups and the cyclohexyl group.

11. A compound of the general formula

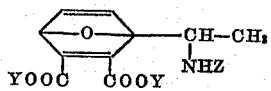

wherein Y is selected from the group consisting of lower alkyl groups and the cyclohexanoyl group, and wherein Z is an acyl radical selected from the group consisting of lower alkanoyl, benzoyl, naphthoyl, α-toluyl, β-phenylpropionyl, and cyclohexanoyl.

12. A compound of the general formula

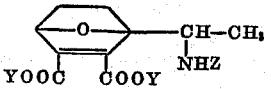

wherein Y is selected from the group consisting of lower alkyl groups and the cyclohexanoyl group, and wherein Z is an acyl radical selected from the group consisting of lower alkanoyl, benzoyl, naphthoyl, α-toluyl, β-phenylpropionyl, and cyclohexanoyl.

References Cited in the file of this patent

UNITED STATES PATENTS 2,432,016    Hofmann _____ Dec. 2, 1947
2,576,080    Tischler _____ Nov. 20, 1951

OTHER REFERENCES

Williams et al.: J. Org. Chem. 20: 1139–1145 (1955).

UNITED STATES PATENT OFFICE
CERTIFICATE OF CORRECTION

Patent No. 2,839,539                                June 17, 1958

Niels Elming et al.

It is hereby certified that error appears in the printed specification of the above numbered patent requiring correction and that the said Letters Patent should read as corrected below.

Column 2, lines 30 to 35, under the arrow connecting Formula Id to Formula IV the term "$A_2O$" should be inserted.

Signed and sealed this 19th day of August 1958.

(SEAL)

Attest:
KARL H. AXLINE
Attesting Officer

ROBERT C. WATSON
                                                           Commissioner of Patents